June 12, 1945. J. A. McCORMICK, JR 2,378,091
METHOD FOR SEPARATING GLASS SHEETS AND THE LIKE
Original Filed Nov. 29, 1941
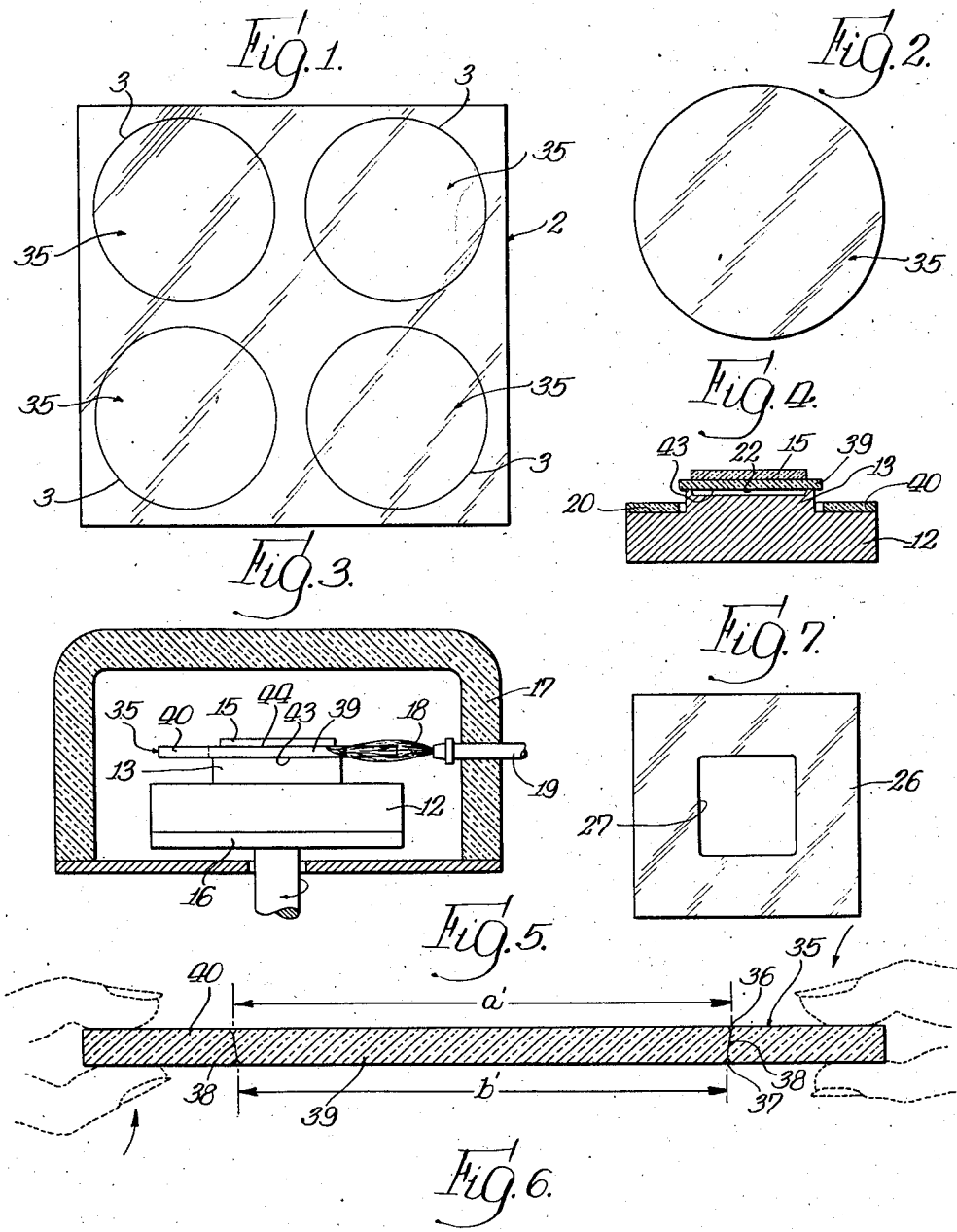
INVENTOR.
Joseph A. McCormick, Jr.,
BY Patented June 12, 1945

2,378,091

UNITED STATES PATENT OFFICE 2,378,091

METHOD FOR SEPARATING GLASS SHEETS AND THE LIKE

Joseph A. McCormick, Jr., Forest Park, Ill., assignor to Dearborn Glass Company, Chicago, Ill., a corporation of Illinois Original application November 29, 1941, Serial No. 420,916. Divided and this application June 5, 1944, Serial No. 538,725

3 Claims. (Cl. 49—77)

My invention relates to a method of separating a sheet of glass or other vitreous material in two separate integral parts. More particularly, the present method is especially adapted for forming openings in sheets of glass or the like.

The present application is a division of my application Serial No. 420,916, filed November 29, 1941, now issued as patent No. 2,372,215, dated March 27, 1945, the latter application being a continuation-in-part of my earlier application Serial No. 362,809, filed October 25, 1940, now issued as patent No. 2,329,922, dated September 21, 1943.

It has long been the practice in the art to form openings in glass sheets by a grinding operation. This method is unsatisfactory for many reasons. For example, in grinding an opening the sheet must be turned over since it must be ground inwardly from both top and bottom surfaces to prevent chipping of the surfaces of the glass sheet adjacent the marginal edge defining the opening. Even if great care is exercised there nevertheless will be slight chipping of the glass surfaces. Grinding, at best, is a slow and expensive process. The marginal edge defining the opening will be roughened and if the glass sheet is to be used for decorative purposes in which this edge is exposed, a polishing operation is necessary. It has been my experience that this method is not economically feasible from a manufacturing standpoint. In addition this method lends itself only to the formation of circular openings.

It is an object of my invention to provide a method for readily separating a glass sheet into two integral portions, in which one portion of the glass sheet initially is substantially included within or surrounded by the other portion of the sheet.

A further object is to provide a method for readily forming openings of any desired configuration in glass sheets and the like.

A further object is to form an opening in a glass sheet or the like so that the surfaces of the sheet are not marred or the marginal edge defining the opening discolored.

A further object is the provision of a method which is adaptable for quantitative production and with which there is substantially no breakage of glass.

In order to attain the above objects I propose to score opposite surfaces of the glass sheet with the scoring on the surface being similar in outline but in which the scoring on one surface lies within the scoring on the other surface. The glass sheet then is preferably flexed slightly by hand to produce a tapered fracture extending through the thickness of the sheet. I have found that by then supporting the sheet in a horizontal plane with the scoring of smaller dimension disposed downwardly and heating the portion of the glass sheet outside the fracture to expand it while maintaining the portion of the sheet within the fracture relatively cool, the two portions may be readily separated to form in the glass sheet an opening with clear sharp edges. Production of the fracture in advance of heating is not absolutely essential in practicing my invention.

Now, it will appear that since the sheet can be readily separated into two separate integral portions either of the portions may constitute the product. Thus, the invention is adaptable for forming glass sheets of intricate contour in which the portion within the score line constitutes the product, or if desired, the outer portion may constitute the product. In either case, shattering of either portion of the glass sheet is avoided.

So far as I am aware the principle of effecting separation of a glass sheet along a tapered fracture in the sheet by causing a relative change in dimensions between the portions defined by the fracture is broadly new. It will be understood that the application of the principle to a glass sheet is illustrative and not limiting, since the method disclosed may be adaptable for use with materials other than glass.

Now in order to acquaint those skilled in the art with the manner of utilizing my invention, I shall disclose in conjunction with the accompanying drawing a specific embodiment of the same.

In the drawing:

Figure 1 is a plan view of a sheet of glass stock which has been scored to provide a number of small circular sheets;

Figure 2 is a plan view of one of the smaller circular sheets of Figure 1;

Figure 3 is a side elevational view of one suitable means for supporting the circular sheet of Figure 2 in a furnace, the furnace being shown in section and somewhat diagrammatically;

Figure 4 is a sectional view of the supporting means of Figure 3 and showing in section, the inner and outer portions of the circular glass sheet separated from each other;

Figure 5 is a cross-sectional view of a glass sheet which has been scored on both surfaces and flexed to cause the tapered fracture;

Figure 6 is a sectional view through a glass sheet which has been scored in the manner shown in Figure 5 and after the inner portion of the sheet has been removed; and Figure 7 is a plan view of a substantially square sheet having a substantially square opening which may be formed by the method of the present invention.

Referring now to Figure 1, I have shown a sheet of flat glass stock 2 which has been scored, at 3, by means of a suitable glass cutter to outline a number of small circular glass sheets 35, one of which is shown in Figure 2, which one is obtained by breaking away the glass sheet 2 outside of scoring 3.

As shown in Figure 5 one surface of one of the sheets 35 is scored as at 36 with a suitable scoring tool to define a circular score line of a diameter $a'$. The sheet is then turned over and the other surface is scored, as at 37, in a suitable manner so this circular score line is of a diameter $b'$, in which diameter $b'$ is somewhat less than the diameter $a'$. Now if the sheet 35 is grasped and slightly flexed as shown in Figure 5, as by grasping opposite marginal edges of the sheet by the hands and exerting force in opposed directions, as illustrated, a fracture or run will extend from the score line 36 to the score line 37 to produce a tapered fracture 38. When it is desired to treat a sheet of double strength glass, i. e., of from 115 to 140 thousandths of an inch thick, I have found that subsequent separation of the inner and outer portions 39 and 40, of Figure 5, from each other may be readily attained if the sheet is suitably scored so that diameter $b'$ is approximately .016 of an inch less than the diameter $a'$, of the sheet of this figure so that the taper 38 extends substantially at an angle of approximately 4°, from the perpendicular. The angle of the fracture may, however, be larger or smaller and satisfactory separation is secured if the angle is within the range of 3° to 10°.

In Figures 3 and 4, I have shown an apparatus suitable for carrying out the practice of the present method. A metal block 12 is provided with an upwardly extending annular projection 13 upon which the surface 43 of the core portion 39 of the circular glass sheet 35 is seated. The diameter of the annular projection 13 preferably is substantially the same as or slightly less than the diameter of the core portion 39. A piece of heat insulating material 15, such as asbestos, is disposed upon the upper surface 44 of the core portion 39. The block member 12 is then preferably placed upon a rotatable platform member 16 in a furnace 17. The glass sheet should preferably be pre-heated before the outer ring portion 40 is brought into direct contact with the flame 18 issuing from the burner 19 since application of a direct flame might break the sheet. The furnace 17 may be designed to readily effect preheating of the glass sheet or other means may be employed, as desired. Rotation of the glass sheet in the flame 18 gradually increases the temperature of the outer ring portion 40 to a greater extent than that of core portion 39. If desired, a plurality of gas burners may be employed for heating the furnace and the ring portion 40.

The insulating material 15 shields the core portion 39 from the flame 18, and the annular projection 13, by conduction, serves to maintain the core portion at a lower temperature than the ring portion 40. As the ring portion 40 is heated it will expand and finally drop away from the core portion 39, and be received by the annular seat 20 of the block 12.

After the portions 39 and 40 have been separated from each other, the block 12 is removed from the furnace and the separated glass pieces removed therefrom, after which another circular glass sheet 35 may be positioned upon the projection 13 and inserted in the furnace to repeat the operation. The rotation of the sheet past the flame is not essential. It is merely a suitable way of getting the outer portion 40 heated up rapidly and fairly evenly.

I have found that it is preferable to form an annular recess 22 in the face of the projection 13 to provide a minimum area of contact between it and the core portion 39 of the glass sheet so that when a glass sheet at room temperature is placed upon the heated block 12, the core portion will not expand the sheet and break it before the temperature of the outer ring portion 40 can be raised to an appropriate degree and the proper temperature differential established between portions 39 and 40 of the sheet. Alternate means for causing separation of the two portions may be readily devised in which the outer ring portion 40 supports the glass sheet and upon creating a difference in temperature of the portions 39 and 40, the core portion 39 will drop away from the supported sheet.

Glass known in the trade as 16 oz. glass and of a thickness of 60 to 83 thousandths of an inch may be readily separated when scored and fractured, as described, by disposing the sheet in an oven at a temperature of approximately 1000° F. for about 1 min. and 10 sec. A sheet of single strength glass i. e. of 83 to 103 thousandths of an inch in thickness may be separated in two integral portions in approximately one min. and 30 sec. at an oven temperature of 1000° F. In practicing the method with double strength glass, i. e. of approximately 110 to 140 thousandths of an inch in thickness, I have found that an oven temperature of approximately 1000° F. the glass sheet is separated in approximately 1 min. 45 sec. In all of the above referred to specific preferred examples of my invention it is estimated that the portion of the glass sheet surrounding the score line attains a temperature of approximately 175 to 200° F. It will be understood that these examples are given merely as illustrative since it is believed that a wide variation may be made between oven temperatures and in the length of time required to attain the separation without departing from the broader concept of my invention.

In Figure 6, there is shown a glass sheet 45 having an opening 46 formed therein by the method as described in connection with Figure 5. The resultant tapered edge defining the opening 46 is not readily discernible and for all practical purposes is unobjectionable. Preferably, however, where glass sheets having openings are to be used for decorative purposes, the scoring should be controlled so that the angle of taper of the edge does not exceed substantially 10°. It will be obvious, however, that if a distinct visible taper is desired that may be accomplished by creating a large difference in diameter between the dimensions $a'$ and $b'$ of Figure 5.

It will be apparent that the invention may be practiced to form openings of any desired configuration, and in Figure 7 I have shown a square sheet of glass 26 having a square opening 27 formed therein by my above described method.

Heat may be extracted from the inner portions at the same time that heat is added to the outer portions if desired. The whole sheet may be heated and the center cooled or the whole sheet may be cooled and the outside portions heated as may be desired.

Obviously, if desired, the above method and apparatus may be employed for forming glass sheets of intricate contour, in which event the portion within the score line comprises the product.

While I have described the method of the present invention in connection with flat sheet glass, it will be readily obvious to those skilled in the art that my method is readily adaptable for forming openings in curved sheets of glass.

I claim:

1. The method of separating an outer part of a glass sheet or the like from an inner part thereof which is substantially included within the outer part, comprising scoring opposite surfaces of the sheet with the scoring on one surface lying within the scoring of the other surface to define said inner part along lines extending through and converging inwardly of said sheet from one of the surfaces thereof, flexing said sheet to fracture the same from the scoring on one surface to the scoring on the other surface whereby the juxtaposed edges of said parts after fracture will be tapered, and thermally expanding said outer part at a faster rate than said inner part to separate the parts from each other along the fracture.

2. The method of separating an outer part of a glass sheet or the like from an inner part thereof which is substantially included within the outer part, comprising scoring opposite surfaces of the sheet with the scoring on one surface lying within the scoring of the other surface to define said inner part along lines extending through and converging inwardly of said sheet from one of the surfaces thereof, flexing said sheet to fracture the same from the scoring on one surface to the scoring on the other surface whereby the juxtaposed edges of said parts after fracture will be tapered, supporting the entire sheet through the support of one of said parts, and thermally expanding said outer part at a faster rate than said inner part to separate the parts from each other along the fracture.

3. The method of separating an outer part of a glass sheet or the like from an inner part thereof which is substantially included within the outer part comprising, scoring opposite surfaces of the sheet with the scoring on one surface lying within the scoring on the other surface to define said inner part along lines extending through and converging inwardly of said sheet from one of the surfaces thereof whereby the juxtaposed edges of said parts after fracture will be tapered, and expanding said outer part more than said inner part to separate the same.

JOSEPH A. McCORMICK, Jr.